United States Patent Office 2,965,533
Patented Dec. 20, 1960

2,965,533

PHOSPHATE ESTERS OF CYANOHYDRINS

Richard R. Whetstone, Denver, Colo., assignor to Shell Oil Company, a corporation of Delaware No Drawing. Filed Apr. 26, 1956, Ser. No. 580,699

10 Claims. (Cl. 167—22)

This invention relates to novel esters of organic phosphoric acids with cyanohydrins of carbonyl compounds; more particularly, it relates to esters of dihydrocarbyl phosphoric acids with cyanohydrins of aldehydes and ketones, said cyanohydrins containing at least two carbon atoms other than the carbon atom of the cyano (—CN) group.

The novel esters of the invention are represented by the formula:

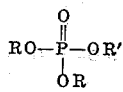

wherein R represents a hydrocarbyl group and —OR' represents the residue —OR' of a cyanohydrin HOR' of a carbonyl compound containing at least two carbon atoms, particularly of such a carbonyl compound containing, in addition to the carbonyl group, a chemically reactive structure, such chemically reactive structure being either a part of the basic structure of the carbonyl compound, or a chemically reactive substituent group.

Suitable as the cyanohydrin from which the group —OR' may be considered to have been derived are the cyanohydrins of acetaldehyde, propionaldehyde, n- and isobutyraldehyde, acetone, methyl ethyl ketone, n-, sec- and tert-butyl methyl ketones, monochloroacetone, sym-dichloroacetone, o-, m-, and p-nitrobenzaldehyde, o-, m-, and p-chlorobenzaldehydes, o-, m-, and p-hydroxybenzaldehydes, o-, m-, and p-alkoxybenzaldehydes, benzyl methyl ketone, phenyl methyl ketone, cyclohexyl phenyl ketone, cyclobutanone, cyclopentanone, cyclohexanone, 2-, 3- and 4-methylcyclohexanones, tridecanone, myristinaldehyde, pentadecanal, palmitinaldehyde, margarinaldehyde, menthone, fluorenone, alpha-hydrindone, and the like. Also included are the cyanohydrins of crotonaldehyde, alpha-chlorocrotonaldehyde, acrolein, oenanthol, methyl ethyl acrolein, alpha-methyl acrolein, chloroacetaldehyde, acetonylacetone, methyl acetonylacetone, ethyl vinyl ketone, benzoylacetone, diacetyl, sym-tetrachlorodiacetyl, cyclopropyl methyl ketone, isobutyraldol, glyoxal, and the like. Also suitable as the cyanohydrins are acetylacetone-bis-cyanohydrin, butyryl-acetone-bis-cyanohydrin, ethyl acetyl-acetone-bis-cyanohydrin, tetrachlorodiacetyl bis cyanohydrin, and the like.

More specifically, the compounds of the invention are represented by the formula:

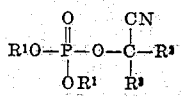

wherein $R^1$ represents a hydrocarbyl group, such as an alkyl, cycloalkyl, aryl, alkaryl, aralkyl or alkenyl group, particularly such groups which contain not more than about 10 carbon atoms, $R^2$ represents an unsubstituted hydrocarbyl group, preferably an unsaturated hydrocarbyl group, or a hydrocarbyl group substituted by at least one chemically reactive group and $R^3$ represents a hydrogen atom or one of the groups represented by $R^2$.

$R^1$ preferably represents a lower alkyl group, particularly a lower alkyl group containing not more than about 6 carbon atoms, including both straight-chain and branched-chain alkyl groups, or a cycloalkyl group containing from 3 to about 6 carbon atoms.

$R^2$ represents such groups as the unsubstituted hydrocarbon groups represented by $R^1$. Preferably, however, $R^2$ represents an unsaturated hydrocarbyl group, or a hydrocarbyl group, either saturated or unsaturated, substituted by at least one chemically reactive group. Exemplary of the unsaturated groups represented by $R^2$ are the alkenyl groups, such as the vinyl, allyl, and crotyl groups, the alkadienyl groups, such as the butadienyl, and pentadienyl groups, the cycloalkenyl groups, such as the cyclobutenyl, and cyclohexenyl groups, the cycloalkadienyl groups, such as the cyclopentadienyl group, and the aromatically unsaturated cyclic hydrocarbyl groups, particularly the phenyl group, the alkyl-substituted phenyl groups, i.e., the alkaryl groups such as the p-methylphenyl and p-ethylphenyl groups, the aralkyl groups, such as the benzyl group, the aralkenyl groups, such as the cinnamyl group, and the like.

Exemplary of the substituted hydrocarbon groups are the substitution products of the above-mentioned hydrocarbon groups substituted with such groups as the halogen atoms, the nitro group, the sulfonic acid group, the hydroxyl group, the carboxyl group or the like.

A particularly desirable subgenus of the new class of compounds is that wherein $R^2$ represents an alkenyl group containing not more than about 10 carbon atoms. It is preferred that the olefinic unsaturation be adjacent to the terminal linking carbon atom of the chain—i.e., that the unsaturation be between the alpha (terminal linking) and beta carbon atoms, between the beta and gamma carbon atoms, or between the gamma and delta carbon atoms of the chain.

Another desirable subgenus is that wherein $R^2$ represents a halogen-substituted aliphatic radical, particularly a perhalo lower alkyl radical, such as the trichloro- and tribromomethyl radicals, the pentachloroethyl radical, and the like. It is preferred that the perhaloalkyl radical contain not more than about 6 carbon atoms.

Specific compounds of the new class include, for example, diethyl 1-cyano-2,2,2-trichloroethyl phosphate, 1-cyanoallyl diethyl phosphate, ethyl butyl 1-cyano-1-(p-nitrophenyl)-methyl phosphate, phenyl methyl 1-cyano-2,2,3,3,3-pentabromopropyl phosphate, cyclohexyl ethyl 1-cyanobuten-3-yl phosphate, diethyl 4-chloroalphacyanophenethyl phosphate, diethyl 1-cyano-cyclohexyl phosphate, dibutyl 1-cyano-1-vinylpropyl phosphate, and the like.

It must be noted that $R^2$ may represent a hydrocarbon group containing one or more additional cyanohydrin grouping(s), so that the invention also includes polyphosphates wherein the phosphate groups are linked by the residues of cyanohydrins—i.e., compounds of the formula:

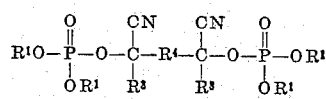

wherein $R^4$ represents a divalent organic radical, preferably a hydrocarbon radical or a hydrocarbon radical substituted by one or more chemically reactive groups, including one or more additional cyanohydrin groups, and $R^3$ and $R^1$ have the definition given heretofore.

The new compounds are of particular utility as agricultural chemicals, for example, as biocides—insecticides, fungicides, nematocides, and the like.

Insecticidally active compounds of the invention may be employed in combatting a wide variety of insects, including the members of the class *Insecta* and also related arthropods, such as mites, spiders, ticks, etc. The compounds of the invention also are useful as foliage fungicides, and as nematocides. In applying the new compounds as insecticides or as foliage fungicides, conventional techniques may be used. For example, a dilute solution (containing from about 0.01 to about 2% by weight) of the active novel compound in an inert solvent or diluent, such as a hydrocarbon solvent, may be sprayed into contact with the insect or fungi, or onto the plant or other object which is to be protected. The active agent may also be applied by the aerosol technique, or in the form of emulsions, or it may be adsorbed on a finely divided inert carrier and applied by dusting techniques. If desirable, insecticidal compositions containing the new compounds may contain other elements which intensify or otherwise add to the effectiveness thereof.

When used as nematocides, any method for introducing the active material below the surface of the soil may be used. For example, holes may be punched in the ground, the active material introduced into its bottom, and the hole covered over. For applications of larger scope, mechanical injectors may be used, or the active material may be introduced into the furrow directly behind the disc or moldboard of a plow or a cultivator. The active material may be used alone, but it is best applied as a solution or dispersion in an inert liquid. Suitable liquids include the various hydrocarbon solvents, water, or the like. The amount of active material used will depend largely upon the degree of infestation of the soil, the physical characteristics of the soil, and to some degree on other factors; in general, it will be found that dosages of from about 0.1 to about 10 gallons of active material per acre will be effective in destroying such nematodes as the root knot nematode—various species of the genus Meloidogyne—the bulb and stem nematodes—various species of the genus Ditylenchus—and the like. The novel compounds are also effective against soil-borne fungi of various kinds.

Methods for conducting the reaction of an acyl compound with a cyanohydrin to form the ester are well known in the art, a typical example thereof being the method described in article by Francis and Davis, in the Journal of the Chemical Society (London), volume 95, pages 1403–1409, (1909).

Accordingly, the new compounds may be prepared conveniently by the reaction of a cyanohydrin with a dihydrocarbyl ester of a halo-phosphate, the reaction being represented by the equation:

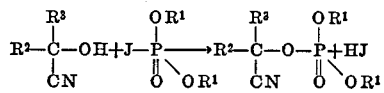

wherein $R^1$, $R^2$ and $R^3$ have the meanings hereinbefore assigned these symbols and J represents a halogen atom. The alkali metal salt of the cyanohydrin is the equivalent of the cyanohydrin itself; also, the cyanohydrin may be formed in situ in the reaction mixture, in which case equimolar proportions of an alkali metal cyanide and the carbonyl compound are equivalent, mole for mole, to the cyanohydrin itself.

The reaction is effected by slowly adding the cyanohydrin or its alkali metal salt to the thoroughly stirred dihydrocarbyl halophosphate, preferably dissolved in a suitable organic solvent. Alternatively, an alkali metal cyanide is slowly added to a thoroughly stirred mixture of the halophosphate and the carbonyl compound, preferably dissolved in a suitable organic solvent. In either case, the reaction mixture temperature must be maintained below about 15° C. until all of the cyanohydrin (or cyanide) has been added; the mixture temperature is then allowed to rise slowly to room temperature. The reactants are employed in substantially equimolar proportions.

The halogen atom of the halophosphate may be any element of Group VIIA of the Periodic Chart of the Elements (Merck and Co., Revised, 1955). It is preferred that the halogen atom be a middle halogen—i.e., chlorine or bromine.

Suitable solvents include any organic liquid which is a good solvent for the halophosphate and the reaction product which is substantially inert under the reaction conditions. Examples of compound suitable as the solvents include the lower aliphatic ethers, esters, hydrocarbons and the like.

Where hydrogen cyanide or the cyanohydrin is used as the initial reactant, a hydrogen halide will be evolved during the reaction and must be removed from the reaction theatre; this is conveniently accomplished through the use of a hydrogen halide acceptor, such as the lower aliphatic tertiary amines, pyridine, or like bases. Where an alkali metal cyanide or alkali metal salt of the cyanohydrin is the reactant, an alkali metal halide is formed and may be removed by extraction of the reaction mixture with water. The presence of a hydrogen halide acceptor is not necessary in such a case.

The following examples illustrate the novel compounds and the methods by which they may be prepared:

EXAMPLE I 148.5 grams (0.86 mole) of diethyl phosphorochloridate and 87 grams (0.86 mole) of triethylamine were dissolved in 300 milliliters of diethyl ether. The mixture was cooled to 4° C. and 73 grams (0.86 mole) of acetone cyanohydrin were added to the thoroughly stirred mixture over a period of 20 minutes, the reaction mixture temperature being maintained between 0° C. and 5° C. The temperature of the mixture was then allowed to rise slowly to room temperature and the mixture was slowly stirred for an additional 15 hours. The mixture was then filtered and the solid material (the hydrogen chloride salt of triethylamine) was washed several times with fresh portions of ether. The filtrate and washings were combined and the product was stripped of the ether under vacuum at 70° C. 173 grams of product were obtained. Additional ether was added to the product, the solution was water washed thoroughly, dried, filtered and stripped of ether. The crude product was then distilled in a molecular still at 110° C. and $1 \times 10^{-5}$ mm. mercury pressure, to yield 63 grams of product, representing a yield of 33.2%. The refractive index of the product (n 20/D) was 1.4193. The product analyzed: 13.9 percent by weight phosphorus, 6.88 percent by weight nitrogen. Diethyl 1-cyano-1-methylethyl phosphate contains 14.0 percent phosphorus and 6.34 percent nitrogen.

EXAMPLE II 148.5 grams (1 mole) of diethyl phosphorochloridate was mixed with 147.4 grams (1 mole) of chloral and the mixture was cooled to 2° C. A solution of 52 grams (1.06 moles) of sodium cyanide in 250 milliliters of water was added to the thoroughly stirred mixture over a period of 30 minutes. The reaction mixture temperature was kept at from 5° C. to 10° C. The temperature of the mixture was then allowed to rise slowly to room temperature and the mixture was allowed to stand at room temperature for another 15 hours. The aqueous phase was then separated from the organic liquid phase, was washed thoroughly with ether and was discarded. The ether washings were added to the product and the resulting mixture thoroughly water washed. The ether solution was then dried, filtered and stripped of ether. 195 grams of crude product were obtained. Molecular distillation of the product at 118° C. and $1 \times 10^{-5}$ mm. mercury pressure gave 127 grams of product, representing a yield of 44.3%. The product had a refractive index (n 20/D) of 1.4555 and analyzed 4.5 percent by weight nitrogen and 34.7 percent by weight chlorine. Diethyl 1-cyano-2,2,2-trichloroethyl phosphate contains 4.5 percent nitrogen and 34.3 percent chlorine.

The utility of these new compounds as agricultural chemicals is illustrated by the following tests and the results obtained therefrom.

EXAMPLE III

Solutions of the novel compounds of the invention were made up employing a neutral petroleum distillate boiling within the kerosene range as the solvent. The solutions were tested for toxicity against the 2-spotted spider mite, *Tetranychus bimaculatus*, and the pea aphid, *Macrosiphum pisi*, by spraying groups of plants infested with the insects under controlled conditions which varied from one test to the other only with respect to the identity of the toxic agent and its concentration. Thus, in each of the several tests, the same total volume of spray was used. Also, tests were carried out using the common housefly, *Musca domestica*, as the test insect, the method used being that described by Y. P. Sun, J. of Econ. Entomology, volume 43, p. 45 et seq. (1950). The following table shows the concentration of active agent in the sprayed solution required to cause approximately 50 percent mortality of the test insect—i.e., the LD 50 concentration. For the purpose of comparison, date on the toxicity of the widely used insecticide, parathion, are included.

Table I

| Test Insect | Approximate Median Lethal Concentration in grams per 100 ml. solvent (LD$_{50}$) | | |
|---|---|---|---|
| | Pea Aphid | 2-spotted spider mite | Housefly |
| Material: | | | |
| Diethyl 1-cyano-1-methylethyl phosphate | 0.015 | 0.006 | 0.09 |
| Diethyl 1-cyano-2,2,2-trichloroethyl phosphate | 0.01 | 0.01 | 0.03 |
| Diethyl 1-cyanoallyl phosphate | | 0.0077 | |
| Parathion (O,O-diethyl O-p-nitrophenyl phosphorothioate) | | 0.04 | |

EXAMPLE IV

This example illustrates the systemic action of active agents of the invention. The tests were carried out by diluting 1% solutions of the active agents in acetone with water to yield the desired concentration. Young growing pinto bean plants infested with mites were carefully removed from the soil, the roots were washed with water, and the roots immersed in the test solution in a glass flask and the flask was stoppered with cotton around the stem of the plant. Mortality readings were taken after 48 hour. In the following table there are shown the concentrations of the active agent in the test solution required to kill 50% of the mites on the infected plant upon 48 hours immersion of the roots in the solution. For comparison, the LD 50 concentration of parathion is given.

Table II

| Active Agent | Concentration, p.p.m., for LD$_{50}$ |
|---|---|
| Diethyl 1-cyano-1-methylethyl phosphate | 100–200 |
| Diethyl 1-cyano-2,2,2-trichloroethyl phosphate | 200 |
| Parathion | >400 |

EXAMPLE V

Nematicidal properties of the new compounds were determined by preparing aqueous solutions of the active compounds each of said solutions containing a different, known concentration of active material. Bulb and stem nematodes (*Ditylenchus dipsaci*) were introduced into each of these solutions and the system held at 60° F. for 24 hours. Mortality of the nematodes is determined microscopically. It was found that both diethyl 1-cyano 1-methylethyl phosphate and 1-cyanoallyl diethyl phosphate were effective at a concentration of about 100 to 200 parts per million. (Under the conditions of this test, D-D, a mixture of 1,2-dichloropropene and 1,2-dichloropropane marketed under this trademark by Shell Chemical Corporation and widely used as a soil fumigant was effective at 300–400 parts per million.)

EXAMPLE VI

The diethyl 1-cyanoallylphosphate mentioned in Examples III and V was prepared as follows:

A solution of acrolein cyanohydrin (24.9 grams—0.3 moles), pyridine (23.7 grams—0.3 mole) and dry ether (approximately 150 ml.) was added in 5 minutes to diethyl phosphorochloridate (51.8 grams—0.3 mole). The temperature gradually rose from room temperature to the reflux temperature of ether. This exothermic reaction ceased at the end of about 1½ hours. The mixture was refluxed gently for 16 hours, cooled, filtered and the solvent removed by stripping to 90° C. and 200 mm. mercury pressure. Molecular distillation gave 25.3 grams of product (0.116 mole=38.6% of theory) at 130° C. and 0.001 mm. mercury pressure.

| Analysis | Product | Calcd. for PNO$_4$C$_8$H$_{14}$ |
|---|---|---|
| Percent Carbon | 43.8 | 43.8 |
| Percent Hydrogen | 7.9 | 6.4 |
| Percent Nitrogen | 5.6 | 6.4 |
| Percent Phosphorus | 14.5 | 14.2 |

I claim as my invention:

1. Diethyl 1-cyano-2,2,2-trichloroethyl phosphate.
2. Diethyl 1-cyano-1-methylethyl phosphate.
3. 1-cyanoallyl diethyl phosphate.
4. An ester of phosphoric acid having the structure represented by the formula:

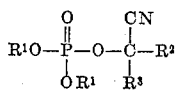

wherein R$^1$ represents an alkyl group of from 1 to 6 carbon atoms, R$^2$ represents a perhaloalkyl group of from 1 to 6 carbon atoms and R$^3$ represents a member of the group consisting of the hydrogen atom and lower alkyl groups.

5. An ester of phosphoric acid having the structure represented by the formula:

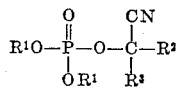

wherein R$^1$ represents an alkyl group of from 1 to 6 carbon atoms, R$^2$ represents an alkenyl group of from 2 to 10 carbon atoms and R$^3$ represents a member of the group consisting of the hydrogen atom and lower alkyl groups.

6. An ester of phosphoric acid having the structure represented by the formula

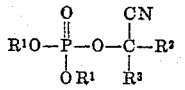

wherein R$^1$ represents an alkyl radical containing from 1 to 10 carbon atoms, R$^2$ represents a member of the group consisting of alkyl radicals containing from 1 to 10 carbon atoms, alkenyl radicals having less than 10 carbon atoms, and the perhaloalkyl radicals of from 1 to 6 carbon atoms, and $R^3$ represents a member of the group consisting of the hydrogen atom and the lower alkyl radicals.

7. A process for protecting plants from destruction by insects, which process comprises bringing the plant to be protected into contact with an ester of phosphoric acid having the structure represented by the formula

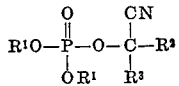

wherein $R^1$ represents an alkyl radical containing from 1 to 10 carbon atoms, $R^2$ represents a member of the group consisting of alkyl radicals containing from 1 to 10 carbon atoms, alkenyl radicals having less than 10 carbon atoms, and the perhaloalkyl radicals of from 1 to 6 carbon atoms, and $R^3$ represents a member of the group consisting of the hydrogen atom and the lower alkyl radicals.

8. A method for destroying insects which comprises contacting the insect to be destroyed with an ester of phosphoric acid having the structure represented by the formula

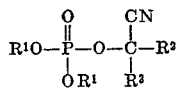

wherein $R^1$ represents an alkyl radical containing from 1 to 10 carbon atoms, $R^2$ represents a member of the group consisting of alkyl radicals containing from 1 to 10 carbon atoms, alkenyl radicals having less than 10 carbon atoms, and the perhaloalkyl radicals of from 1 to 6 carbon atoms, and $R^3$ represents a member of the group consisting of the hydrogen atom and the lower alkyl radicals.

9. A process for protecting plants from destruction by insects, which process comprises bringing the plant to be protected into contact with an ester of phosphoric acid having the structure represented by the formula

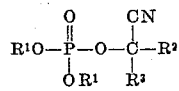

wherein $R^1$ represents an alkyl group of from 1 to 6 carbon atoms, $R^2$ represents a perhaloalkyl group of from 1 to 6 carbon atoms and $R^3$ represents a member of the group consisting of the hydrogen atom and lower alkyl groups.

10. A process for protecting plants from destruction by insects, which process comprises bringing the plant to be protected into contact with an ester of phosphoric acid having the structure represented by the formula

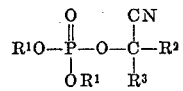

wherein $R^1$ represents an alkyl group of from 1 to 6 carbon atoms, $R^2$ represents an alkenyl group of from 2 to 10 carbon atoms and $R^3$ represents a member of the group consisting of the hydrogen atom and lower alkyl groups.

References Cited in the file of this patent

UNITED STATES PATENTS

| | | |
|---|---|---|
| 2,494,283 | Cassaday et al. | Jan. 10, 1950 |
| 2,494,284 | Cassaday et al. | Jan. 10, 1950 |
| 2,611,728 | Bartlett et al. | Sept. 23, 1952 |
| 2,815,312 | Schuler | Dec. 3, 1957 |

FOREIGN PATENTS

| | | |
|---|---|---|
| 518,542 | Canada | Nov. 15, 1955 |

OTHER REFERENCES

Kabachnik et al.: "Chem. Abst.," vol. 42, vol. 4132–3 (1948).